US011335093B2

(12) United States Patent
Shrivastava et al.

(10) Patent No.: US 11,335,093 B2
(45) Date of Patent: May 17, 2022

(54) VISUAL TRACKING BY COLORIZATION

(71) Applicant: Google LLC, Mountain View, CA (US)

(72) Inventors: Abhinav Shrivastava, Mountain View, CA (US); Alireza Fathi, Redwood City, CA (US); Sergio Guadarrama Cotado, Berkeley, CA (US); Kevin Patrick Murphy, Palo Alto, CA (US); Carl Martin Vondrick, New York, NY (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/966,102

(22) PCT Filed: Jun. 12, 2019

(86) PCT No.: PCT/US2019/036712
§ 371 (c)(1),
(2) Date: Jul. 30, 2020

(87) PCT Pub. No.: WO2019/241346
PCT Pub. Date: Dec. 19, 2019

(65) Prior Publication Data
US 2021/0089777 A1 Mar. 25, 2021

Related U.S. Application Data

(60) Provisional application No. 62/684,527, filed on Jun. 13, 2018.

(51) Int. Cl.
*G06V 20/40* (2022.01)
*G06N 3/08* (2006.01)
(Continued)

(52) U.S. Cl.
CPC .......... *G06V 20/41* (2022.01); *G06K 9/6215* (2013.01); *G06K 9/6256* (2013.01); *G06N 3/04* (2013.01); *G06N 3/08* (2013.01); *G06V 10/56* (2022.01)

(58) Field of Classification Search
CPC .......... G06K 9/00718; G06K 9/00711; G06K 9/4652; G06K 2009/4657; G06K 9/4647;
(Continued)

(56) References Cited

U.S. PATENT DOCUMENTS 5,912,994 A * 6/1999 Norton ................... H04N 5/262
382/283
6,549,643 B1 * 4/2003 Toklu ................. G06K 9/00751
382/107

(Continued)

OTHER PUBLICATIONS

Agrawal et al., "Learning to Poke by Poking: Experimental Learning of Intuitive Physics", Advances in Neural Information Processing Systems, dated 2016, 9 pages.

(Continued)

*Primary Examiner* — Andrew M Moyer
*Assistant Examiner* — Stephen M Brinich
(74) *Attorney, Agent, or Firm* — Fish & Richardson P.C.

(57) ABSTRACT

Methods, systems, and apparatus, including computer programs encoded on a computer storage medium, for performing visual tracking. In one aspect, a method comprises receiving: (i) one or more reference video frames, (ii) respective reference labels for each of a plurality of reference pixels in the reference video frames, and (iii) a target video frame. The reference video frames and the target video frame are processed using a colorization machine learning model to generate respective pixel similarity measures between each of (i) a plurality of target pixels in the target video frame, and (ii) the reference pixels in the reference video frames. A respective target label is determined for each target pixel in the target video frame, comprising: combining (i) the reference labels for the reference pixels in the reference video frames, and (ii) the pixel similarity measures.

20 Claims, 5 Drawing Sheets

(51) Int. Cl.
  G06V 10/56 (2022.01)
  G06K 9/62 (2022.01)
  G06N 3/04 (2006.01)
(58) Field of Classification Search
  CPC .. G06K 9/6214; G06K 9/6215; G06K 9/6211; G06K 9/6212; G06K 9/6255; G06K 9/6256; G06N 3/04; G06N 3/08; G06V 10/56; G06V 10/40
  USPC .......................... 382/155–158, 162–167, 232
  See application file for complete search history.

(56) References Cited

U.S. PATENT DOCUMENTS

| | | | |
|---|---|---|---|
| 2002/0147834 A1* | 10/2002 | Liou | H04N 21/262 709/236 |
| 2010/0085372 A1* | 4/2010 | Levin | H04N 9/43 345/589 |
| 2014/0071347 A1 | 3/2014 | Chen et al. | |
| 2019/0022492 A1* | 1/2019 | Takahashi | G06T 19/006 |
| 2021/0201071 A1* | 7/2021 | Liao | G06T 11/001 |

OTHER PUBLICATIONS

Badrinarayanan et al., "Label Propagation in Video Sequences", Computer Vision and Pattern Recognition, dated 2010, 8 pages.
Bahdanau et al., "Neural Machine Translation by Jointly Learning to Align and Translate", arXiv preprint arXiv, dated May 19, 2016, 15 pages.
Brox et al., "Object Segmentation by Long Term Analysis of Point Trajectories", European Conference on Computer Vision, dated 2010, 14 pages.
Caelles et al., "One-Shot Video Object Segmentation", CVPR, dated 2017, 10 pages.
Chia et al., "Semantic Colorization with Internet Images", ACM Transactions on Graphics, dated 2011, 7 pages.
Deng et al., "A Large-Scale Hierarchical Image Database", Computer Vision and Pattern Recognition, dated 2009, 8 pages.
Deshpande et al., "Learning Large-Scale Automatic Image Colorization", Proceedings of the IEEE International Conference on Computer Vision, dated 2015, 9 pages.
Doersch et al., "Multi-task Self-Supervised Visual Learning", The IEEE International Conference on Computer Vision, dated 2017, 10 pages.
Doersch et al., "Unsupervised Visual Representation Learning by Context Prediction", Proceedings of the IEEE International Conference on Computer Vision, dated 2015, 8 pages.
Faktor et al., "Video Segmentation by Non-Local Consensus Voting", BMVC, dated 2014, 12 pages.
Fish Tung et al., "Self-Supervised Learning of Motion Capture", Advances in Neural Information Processing Systems, dated 2017, 11 pages.
Fragkiadaki et al., "Video Segmentation by Tracing Discontinuities in a Trajectory Embedding", Computer Vision and Pattern Recognition, dated 2012, 8 pages.
Grundmann et al., "Efficient Hierarchical Graph-Based Video Segmentation", CVPR, dated 2010, 8 pages.
Guadarrama et al., "Pixcolor: Pixel Recursive Colorization", arXiv preprint arXiv, dated 2017, 17 pages.
Gupta et al., "Image Colorization Using Similar Images", Proceedings of the 20th ACM International Conference on Multimedia, ACM, dated 2012, 10 pages.
He et al., "Deep Residual Learning for Image Recognition", Proceedings of the IEEE Conference on Computer Vision and Pattern Recognition, dated 2016, 9 pages.
Heu et al., "Image and Video Colorization Based on Prioritized Source Propagation", Image Processing ICIP, dated 2009, 4 pages.
Iizuka et al., "Let There Be Color!: Joint End-to-End Learning of Global and Local Image Priors for Automatic Image Colorization with Simultaneou Classification", ACM Transactions on Graphics, dated 2016, 11 pages.
Ilg et al., "Flownet 2.0: Evolution of Optical Flow Estimation with Deep Networks", IEEE Conference on Computer Vision and Pattern Recognition, dated 2017, 9 pages.
Irony et al., "Colorization by Example", Eurographics Symposium on Rendering, dated 2005, 10 pages.
Isola et al., "Image to Image Translation with Conditional Adversarial Networks", arXiv preprint, dated 2017, 10 pages.
Jayaraman et al., "Learning Image Representations Tied to Ego-Motion", Proceedings of the IEEE International Conference on Computer Vision, dated 2015, 9 pages.
Jhuang et al., "Towards Understanding Action Recognition", International Conference on Computer Vision, dated Dec. 2013, 7 pages.
Kay et al., "The Kinetics Human Action Video Dataset", arXiv preprint arXiv, dated May 2017, 22 pages.
Khoreva et al., "Lucid Data Dreaming for Multiple Object Tracking", arXiv preprint arXiv, dated 2017, 20 pages.
Kingma et al., "A Method for Stochastic Optimization", arXiv preprint arXiv, dated Jan. 30, 2017, 15 pages.
Larsson et al., "Colorization as a Proxy Task for Visual Understanding", CVPR, dated 2017, 10 pages.
Larsson et al., "Learning Representations for Automatic Colorization", European Conference on Computer Vision, dated 2016, 29 pages.
Lin et al., "Microsoft coco: Common Objects in Context", European Conference on Computer Vision, dated 2014, 16 pages.
Liu et al., "Beyond Pixels: Exploring New Representations and Applications for Motion Analysis", PhD Thesis, Massachusetts Institute of Technology, Electrical Engineering and Computer Science, dated Jun. 2009, 164 pages.
Liu et al., "Instrinsic Colorization", ACM Transactions on Graphics, ACM, dated 2008, 10 pages.
Marki et al., "Bilateral Space Video Segmentation", Proceedings of the IEEE Conference on Computer Vision and Pattern Recognition, dated 2016, 9 pages.
Noroozi et al., "Unsupervised Learning of Visual Representations by Solving Jigsaw Puzzles", European Conference on Computer Vision, Springer, dated 2017, 19 pages.
Owens et al., "Ambient Sound Provides Supervision for Visual Learning", European Conference on Computer Vision, dated Dec. 2017, 19 pages.
Pathak et al., "Context encoders: Feature Learning by Inpainting", Proceedings of the IEEE Conference on Computer Vision and Pattern Recognition, dated 2016, 9 pages.
Pathak et al., "Learning Features by Watching Objects Move", Proc. CVPR, dated 2017, 10 pages.
PCT International Preliminary Report in International Application No. PCT/US2019/036712, dated Dec. 24, 2020, 9 pages.
PCT International Search Report and Written Opinion in International Application No. PCT/US2019/036712 dated Aug. 28, 2019, 16 pages.
Perazzi et al., "A Benchmark Dataset and Evaluation Methodology for Video Object Segmentation", Proceedings of the IEEE Conference on Computer Vision and Pattern Recognition, dated 2016, 9 pages.
Perazzi et al., "Fully Connected Object Proposals for Video Segmentation", Proceedings of the IEEE International Conference on Computer Vision, dated 2015, 8 pages.
Perazzi et al., "Learning Video Object Segmentation from Static Images", Computer Vision and Pattern Recognition, dated 2017, 10 pages.
Pinto et al., "The Curious Robot: Learning Visual Representations via Physical Interactions", European Conference on Computer Vision, dated Sep. 2017, 10 pages.
Pont-Tuset et al., The 2017 Davis Challenge on Video Object Segmentation, arXiv preprint arXiv, dated Mar. 2018, 6 pages.
Ramakanth et al., "SeamSeg: Video Object Segmentation Using Patch Seams", CVPR, dated 2014, 8 pages.

(56) References Cited

OTHER PUBLICATIONS

Vijayanarasimhan et al., "Active Frame Selection for Label Propagation in Videos", European Conference on Computer Vision, dated 2012, 14 pages.
Vinyals et al., "Matching Networks for One Shot Learning", Advances in Neural Information Processing Systems, dated 2016, 9 pages.
Vinyals et al., "Pointer Networks", arXiv, dated 2015, 9 pages.
Vondrick et al., "Tracking Emerges by Colorizing Videos" ECCV, Oct. 2018, 18 pages.
Vondrick et al., "Generating Videos with Scene Dynamics", Advances in Neural Information Processing Systems, dated 2016, 9 pages.
Wang et al., "Transitive Invariance for Self-Supervised Visual Representation Learning", arXiv preprint arXiv, dated 2017, 10 pages.
Wang et al., "Unsupervised Learning of Visual Representations using Videos", arXiv preprint, dated 2015, 9 pages.
Welsh et al., "Transferring Color to Greyscale Images", ACM Transactions on Graphics, vol. 21, ACM, dated 2002, 4 pages.
Wu et al., "Physics 101: Learning Physical Object Properties from Unlabeled Videos", BMVC, vol. 2, dated 2016, 12 pages.
Xu et al., "Evaluation of Super-Voxel Methods for Early Video Processing", Computer Vision and Pattern Recognition CVPR, dated 2012, 8 pages.
Yang et al., "Articulated Human Detection with Flexible Mixtures of Parts", IEEE Transactions on Pattern Analysis and Machine Intelligence, dated 2013, 13 pages.
Yang et al., "Efficient Video Object Segmentation via Network Modulation", arXiv preprint arXiv, dated 2018, 9 pages.
Yatziv et al., "Fast Image and Video Colorization Using Chrominance Blending", IEEE Transactions on Image Processing, dated 2006, 16 pages.
Zhang et al., "A Split-brain Autoencoders: Unsupervised Learning by Cross-Channel Prediction", dated 2017, 10 pages.
Zhang et al., "Colorful Image Colorization", European Conference on Computer Vision, dated 2016, 29 pages.
Zhou et al., "Learning Dense Correspondence via 3d-guided Cycle Consistency", Proceedings of the IEEE Conference on Computer Vision and Pattern Recognition, dated 2016, 10 pages.
Zhou et al., "Unsupervised Learning of Depth and Ego-Motion from Video", CVPR, vol. 2, dated 2017, 10 pages.
Zhou et al., "View Synthesis by Appearance Flow", European Conference on Computer Vision, Spring, dated 2016, 16 pages.

\* cited by examiner

| Method | Supervised? | Segment | Boundary |
|---|---|---|---|
| 402 → Identity | | 22.1 | 23.6 |
| 404 → Single Image Colorization | | 4.7 | 5.2 |
| 406 → Optical Flow (Coarse-to-Fine) [59] | | 13.0 | 15.1 |
| 408 → Optical Flow (FlowNet2) [23] | | 26.7 | 25.2 |
| 410 → Ours | | 34.6 | 32.7 |
| 412 → Fully Supervised [47, 46] | ✓ | 55.1 | 62.1 |

VISUAL TRACKING BY COLORIZATION

CROSS-REFERENCE TO RELATED APPLICATION

This application is a National Stage Application under 35 U.S.C. § 371 and claims the benefit of International Application No. PCT/US2019/036712, filed Jun. 12, 2019, which claims priority to U.S. Application No. 62/684,527, filed Jun. 13, 2018, the disclosure of which is incorporated herein by reference.

BACKGROUND

This specification relates to processing data using machine learning models.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification describes a system implemented as computer programs on one or more computers in one or more locations that performs visual tracking.

According to a first aspect there is provided a method comprising receiving: (i) one or more reference video frames, (ii) respective reference labels for each of a plurality of reference pixels in the reference video frames, and (iii) a target video frame; processing the reference video frames and the target video frame using a colonization machine learning model to generate respective pixel similarity measures between each of (i) a plurality of target pixels in the target video frame, and (ii) the reference pixels in the reference video frames, wherein the colonization machine learning model is trained to generate pixel similarity measures wherein a respective estimated color of each of target pixel in the target video frame is defined by combining: (i) actual colors of each of the reference pixels in the reference video frames, and (ii) the pixel similarity measures; and determining a respective target label for each target pixel in the target video frame, comprising: combining (i) the reference labels for the reference pixels in the reference video frames, and (ii) the pixel similarity measures.

The reference pixels in the reference video frames may comprise a proper subset of the pixels in the reference video frames.

The reference video frames and the target video frames may be decolorized prior to being processed by the colorization machine learning model.

The colorization machine learning model may include an embedding neural network, and wherein processing the reference video frames and the target video frame using the colorization machine learning model to generate respective pixel similarity measures between each of (i) the target pixels in the target video frame, and (ii) the reference pixels in the reference video frames may comprises: providing the reference video frames and the target video frame as an input to the embedding neural network; processing the input in accordance with current values of embedding neural network parameters to generate a respective embedding of each of (i) the target pixels in the target video frame, and (ii) the reference pixels in the reference video frames; and generating the respective pixel similarity measures between each of (i) the target pixels in the target video frame, and (ii) the reference pixels in the reference video frames using the embeddings.

The embedding neural network may comprise one or more convolutional neural network layers.

Generating the respective pixel similarity measures between each of (i) the target pixels in the target video frame, and (ii) the reference pixels in the reference video frames using the embeddings may comprise: generating the pixel similarity measure between a target pixel and a reference pixel using a similarity measure between the embedding of the target pixel and the embedding of the reference pixel.

A label for a pixel may comprise data indicating, for each of multiple possible categories, a respective likelihood that the pixel corresponds to the category.

A label for a pixel may comprise data indicating, for each of multiple possible key points, a respective likelihood that the pixel corresponds to the key point.

The colorization machine learning model may be trained by a plurality of operations comprising: obtaining a plurality of training examples, wherein each training example comprises: (i) one or more training reference video frames, (ii) a training target video frame, and (iii) actual colors of each pixel in the training reference video frames and the training target video frame; processing the training reference video frames and the training target video frame using the colorization machine learning model to generate respective similarity measures between: (i) each pixel in the training target video frame, and (ii) each pixel in the training reference video frames; determining estimated colors of each pixel in the training target video frame by combining: (i) the actual colors of each pixel in the training reference video frames, and (ii) the similarity measures; and adjusting the current values of the embedding neural network parameters based on a difference between: (i) the actual colors of each pixel in the training target video frame, and (ii) the estimated colors of each pixel in the training target video frame.

Adjusting the current values of the embedding neural network parameters may comprise: determining a gradient of a loss function, wherein the loss function depends on the difference between: (i) the actual colors of each pixel in the training target video frame, and (ii) the estimated colors of each pixel in the training target video frame; and adjusting the current values of the embedding neural network parameters using the gradient.

The reference labels for the reference pixels in one or more of the reference video frames may have been previously determined using the colorization machine learning model.

The target labels may be used to track a position of an object in the reference video frames to the target video frame.

According to a second aspect there is provided a system, comprising: a data processing apparatus; and a memory in data communication with the data processing apparatus and storing instructions that cause the data processing apparatus to perform the operations of the respective method of the first aspect.

According to a third aspect there is provided one or more non-transitory computer storage media storing instructions that when executed by one or more computers cause the one or more computers to perform the operations of the respective method of the first aspect.

The subject matter described in this specification can be implemented in particular embodiments so as to realize one or more of the following advantages. The system described in this specification can be trained to perform visual tracking using raw, unlabeled color video data. Therefore, the large amount of unlabeled color video data which is readily available (e.g., on video sharing websites) can be exploited to train the system described in this specification. In contrast, some conventional visual tracking systems must be trained using manually labeled video data (e.g., where a human has manually labelled the pixels of the video frames). Manually labeling video data is tedious, time consuming, and difficult (e.g., because many video frame rates exceed 24 frames-per-second, thereby requiring manual labeling of at least 24 video frames to obtain one second of manually labeled data). Therefore the system described in this specification enables more efficient use of computational resources, particularly memory resources, by enabling unlabeled color video data stored in a memory to be directly used as training data (i.e., for training a colorization machine learning model to be used in visual tracking). Moreover, the system described in this specification can perform visual tracking more effectively (e.g., with a higher accuracy) than some conventional systems (e.g., systems based on optical flow methods).

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a system implemented as computer programs on one or more computers in one or more locations that performs visual tracking in sequences of video frames. Visual tracking refers to determining a position of an object (or other point of interest) in a video frame given the position of the object (or other point of interest) in one or more other video frames.

The system can learn to perform visual tracking without manual human supervision using unlabeled videos, i.e., where a person has not manually annotated pixel labels or tracking data on the video frames. In particular, the system automatically learns to track visual regions by learning to colorize a gray-scale "target" video frame in a video by copying colors from one or more "reference" video frames in the video. By learning to perform colorization in this manner, the system learns a "pointing" mechanism that points from pixels in the target video frame to corresponding pixels in the reference video frames in order to copy the right colors. Once the system is trained, the learned pointing mechanism acts as a tracker across time that can be used to perform visual tracking.

These features and other features are described in more detail below.

Figure 1:
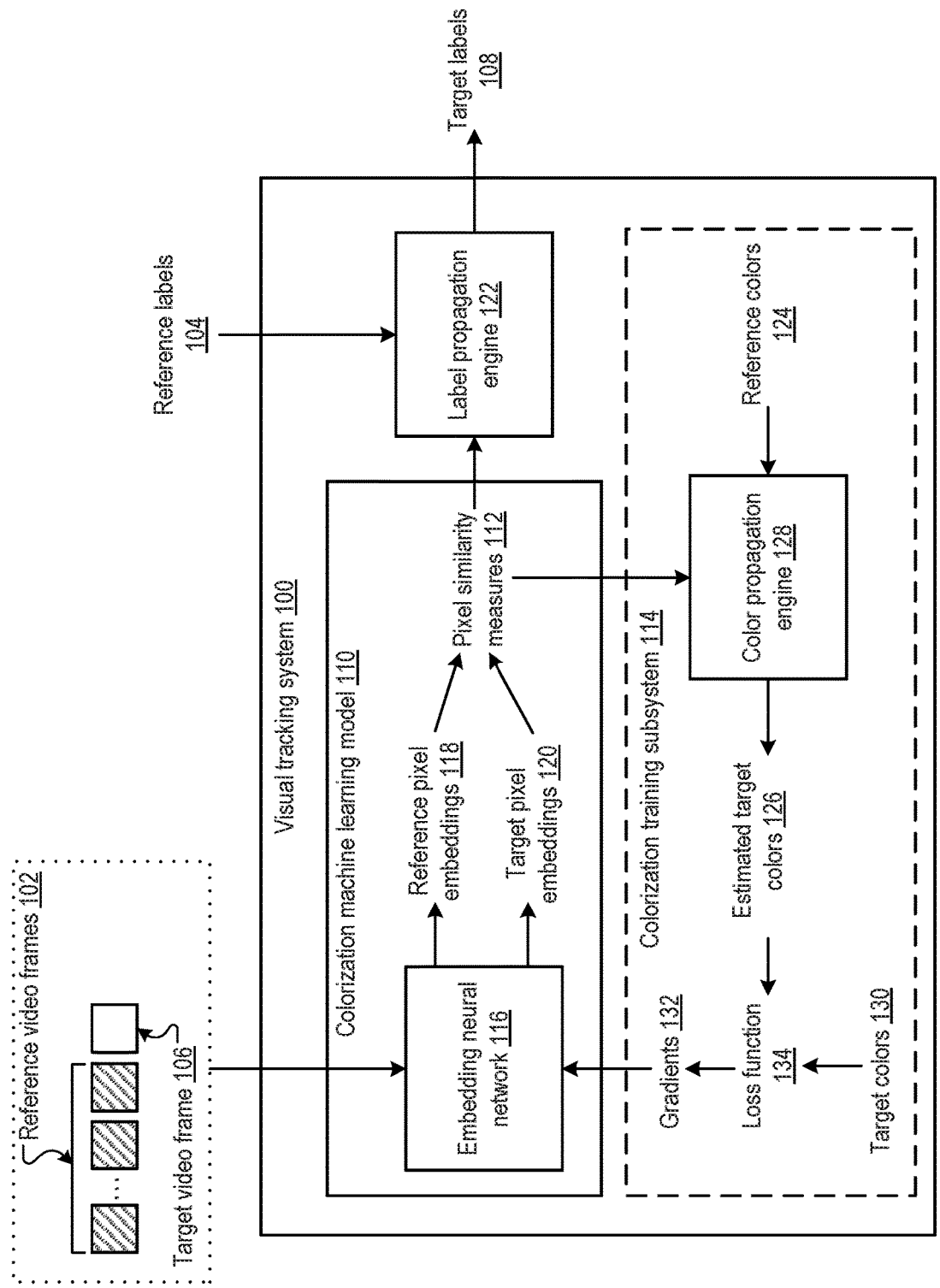
FIG. 1 shows an example visual tracking system.

FIG. 1 shows an example visual tracking system 100. The visual tracking system 100 is an example of a system implemented as computer programs on one or more computers in one or more locations in which the systems, components, and techniques described below are implemented.

The visual tracking system 100 is configured to receive an input including (i) one or more reference video frames 102, (ii) respective reference labels 104 for the pixels from the reference video frames 102, and (iii) a target video frame 106. The system 100 processes the input to generate respective target labels 108 for the pixels from the target video frame 106. The reference video frames 102 and the target video frame 106 may be consecutive video frames from a video (e.g., a video depicting the natural world or a computer-generated video).

In some implementations, a label for a pixel (e.g., the reference labels 104 or the target labels 108) indicates, for each of multiple possible categories, a respective likelihood that the pixel corresponds to the category. For example, the categories may include multiple different objects (e.g., people, cars, animals, and the like) and a background category. The label may be represented as a vector of numerical values representing the likelihoods that the pixel corresponds to each of the possible categories. In some implementations, a label for a pixel indicates, for each of multiple possible key points, a respective likelihood that the pixel corresponds to the key point. For example, the key points may include human pose key points (e.g., the position of the head, the shoulders, the elbows, and the like). The label may be represented as a vector of numerical values representing the likelihoods that the pixel corresponds to each of the possible key points.

By generating the target labels 108 for the target video frame 106 from the reference labels 104 for the reference video frames 102, the system 100 can perform visual tracking. Visual tracking refers to determining a position of an object (or other point of interest) in the target video frame 106 given the position of the object (or other point of interest) in the reference video frames 102. For example, the system 100 may perform visual tracking by determining the position of a particular person in the target video frame 106 (e.g., as defined by the target labels 108) given the position of the particular person in the reference video frames 102 (e.g., as defined by the reference labels 104).

The reference labels 104 may be generated by manual annotation, that is, by a person assigning respective labels to the pixels of the reference video frames 102 (e.g., using a non-automated or semi-automated annotation procedure). In some cases, the system 100 receives reference video frames and corresponding reference labels for the initial video frames of a video, and iteratively determines target labels for each subsequent video frame of the video. More specifically, after determining target labels 108 for a target video frame 106, the system may determine the target video frame to be a reference video frame and the corresponding target labels to be reference labels. Thereafter, the system 100 may use the newly determined reference video frame and reference labels to generate target labels for subsequent video frames. In this manner, the system 100 may visually track the position of an object (e.g., a particular person, as described earlier) through every video frame of a video.

Generally, the reference video frames 102 and the target video frame 106 may be color video frames, that is, video frames where each pixel is associated with data defining a color for the pixel. For example, the reference video frames 102 and the target video frame 106 may be RGB video frames, where each pixel is associated with respective intensities of a red color channel, a green color channel, and a blue color channel. Prior to processing the reference video frames 102 and the target video frame 106, the system 100 partly or fully "decolorizes" the reference video frames 102 and the target video frame 106, e.g., by converting them to a non-color format. For example, prior to processing the reference video frames 102 and the target video frame 106, the system 100 may convert them to a grayscale format.

To generate the target labels 108 for the target video frame 106, the system 100 processes the decolorized reference video frames 102 and the decolorized target video frame 106 using a colorization machine learning model 110 to generate respective pixel similarity measures 112 between the pixels of the target video frame 106 and the pixels of the reference video frames 102. The pixel similarity measure 112 between a target pixel from the target video frame 106 and a reference pixel from a reference video frame 102 may be represented as a number. As will be described in more detail later, the system 100 includes a colorization training subsystem 114 which trains the colorization machine learning model 110 to generate pixel similarity measures 112 that can be used to "colorize" the decolorized target video frame 106 using the colors of the pixels from the reference video frames 102.

The colorization machine learning model 110 generates the pixel similarity measures 112 by providing the decolorized reference video frames 102 and the decolorized target video frame 106 as an input to an embedding neural network 116. The embedding neural network 116 is configured to process the input in accordance with current values of embedding neural network parameters to generate a respective embedding of each of the pixels from the reference video frames 102 (i.e., the reference pixel embeddings 118) and of each of the pixels of the target video frame 106 (i.e., the target pixel embeddings 120). An embedding of a pixel refers to a representation of the pixel as an ordered collection of numerical values, for example, as a vector or a matrix of numerical values. The system 100 generates the pixel similarity measures 112 using the reference pixel embeddings 118 and the target pixel embeddings 120. For example, for a given target pixel from the target video frame 106 and a given reference pixel from a reference video frame 102, the system 100 may generate the pixel similarity measure 112 between the target pixel and the reference pixel based on a similarity measure (e.g., an inner product) between the reference pixel embedding 118 and the target pixel embedding 120.

The system 100 provides the pixel similarity measures 112 and the reference labels 104 as an input to a label propagation engine 122 which is configured to generate the target labels 108 using the pixel similarity measures 112 and the reference labels 104. For example, the label propagation engine 122 may generate the target labels 108 for the target video frame 106 by "propagating" the reference labels 104 from the reference video frames 102 to the target video frame 106 in accordance with the pixel similarity measures 112. More specifically, the label propagation engine 122 may generate a target label 108 for a given target pixel from the target video frame 106 as a linear combination of the reference labels 104 where the reference labels 104 are weighted by the pixel similarity measures 112.

An example process for performing visual tracking by determining the target labels 108 for the target video frame 106 is described in more detail with reference to FIG. 5.

To enable the system 100 to effectively generate target labels 108 for target video frames 106, the system 100 includes a colorization training subsystem 114 which is configured to train the embedding neural network 116. The training subsystem 114 trains the embedding neural network 116 over multiple training iterations to determine trained values of the embedding neural network parameters from initial values of the embedding neural network parameters. The training subsystem 114 can train the embedding neural network 116 on large amounts of readily available unlabeled color video data without requiring manual human supervision (e.g., without requiring a human to manually annotated pixel labels on the video data).

At each training iteration, the training subsystem 114 obtains reference video frames 102 and a target video frame 106 which are represented in a color format (e.g., as RGB video frames). More specifically, each reference pixel from a reference video frame 102 is associated with a reference color 124, and each target pixel from the target video frame 106 is associated with a target color 130. For example, when the color format is an RGB color format, the reference color 124 associated with a reference pixel (or the target color 130 associated with a target pixel) may be represented as a three-dimensional vector, with different dimensions corresponding to the red, green, and blue color channels respectively. The reference video frames 102 and the target video frame 106 obtained by the training subsystem 114 are not necessarily associated with pixel labels (e.g., reference labels 104 or target labels 108).

The training subsystem 114 decolorizes the reference video frames 102 and the target video frame 106 (e.g., by converting them to grayscale) and processes them using the colorization machine learning model 110 to generate the pixel similarity measures 112. The training subsystem 114 provides the pixel similarity measures 112 and the reference colors 124 as an input to a color propagation engine 128 which is configured to process the input to generate estimated target colors 126 for the pixels from the target video frame 106. The estimated target colors 126 include an estimated color (e.g., represented in an RGB format, as described earlier) for each target pixel from the target video frame 106. The color propagation engine 128 is configured to operate analogously to the label propagation engine 122, that is, by propagating the reference colors 124 from the reference video frames 102 to the target video frame 106 in accordance with the pixel similarity measures 112 to "colorize" the target video frame 106. For example, the color propagation engine 128 may generate an estimated target color 126 for a given target pixel from the target video frame 106 as a linear combination of the reference colors 124, where the reference colors 124 are weighted by the pixel similarity measures 112.

After generating the estimated target colors 126, the training subsystem 114 adjusts the current values of the embedding neural network parameters to cause the system 100 to colorize the target video frame 106 more accurately. More specifically, the training subsystem 114 adjusts the current values of the embedding neural network parameters based on a difference between: (i) the (actual) target colors 130 of the target pixels in the target video frame 106, and (ii)

the estimated target colors 126 of the target pixels in the target video frame 106. The training subsystem 114 adjusts the current values of the embedding neural network parameters using a gradient 132 of a loss function 134 with respect to the current values of the embedding neural network parameters. The loss function 134 depends on an error between the actual target colors 130 of the target pixels and the estimated target colors 126 of the target pixels.

The pixel similarity measures 112 can operate as "pointers" from the target pixels of the target video frame 106 to the reference pixels of the reference video frames 102, where the strength of a pointer from a target pixel to a reference pixel is determined by the magnitude of the corresponding pixel similarity measure 112. By training the system 100 to colorize target video frames 106 from reference video frames 102, the training subsystem 114 causes the colorization machine learning model 110 to learn to generate pixel similarity measures 112 which "point" from target pixels in the target video frame 106 to the right reference pixels in the reference video frames 102. Once the colorization machine learning model 110 is trained, the learned "pointing" mechanism is used to propagate reference labels 104 from the reference video frames 102 to the target video frame 106, thereby enabling visual tracking.

An example process for training the colorization machine learning model is described in more detail with reference to FIG. 6.

Figure 2:
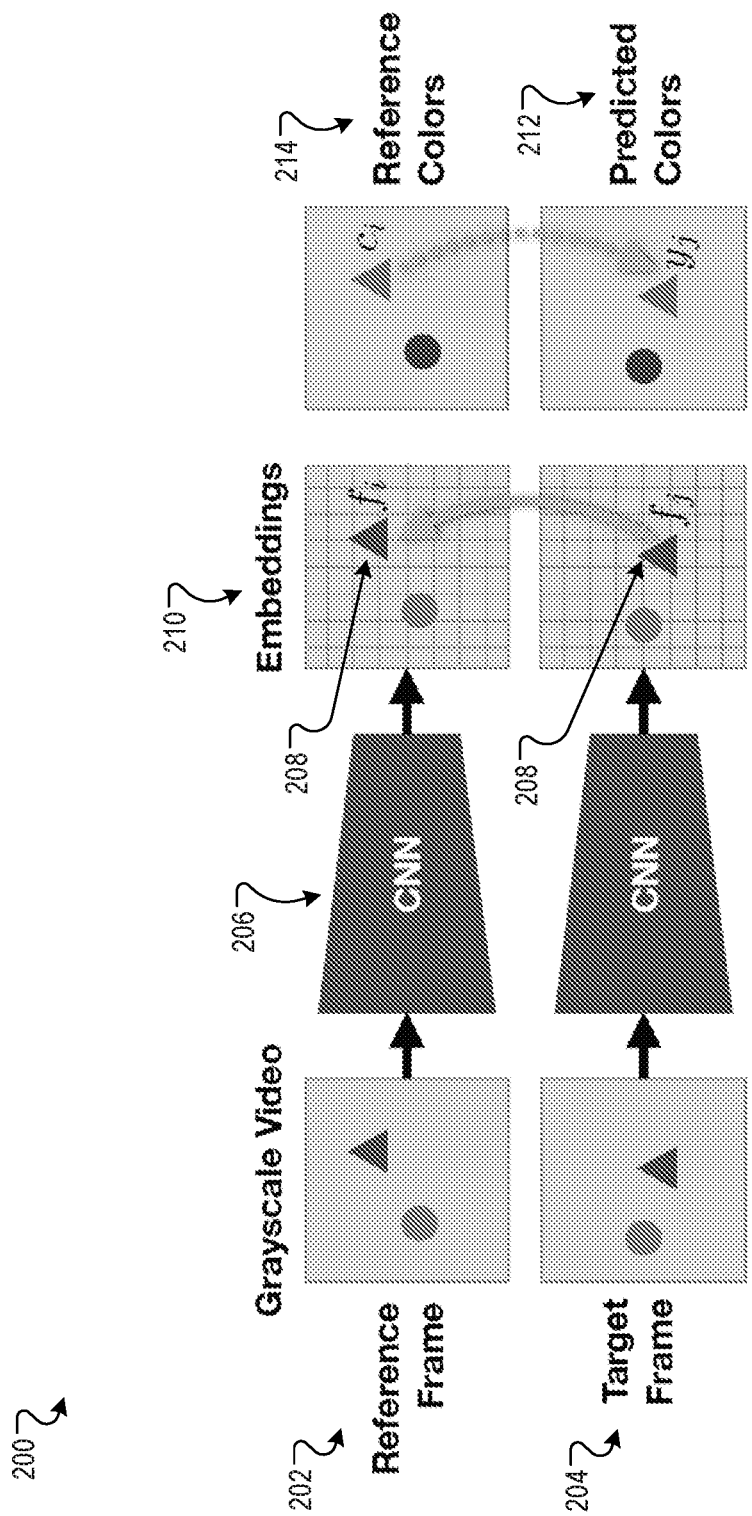
FIG. 2 is an illustration of an example data flow for using the visual tracking system to track a positon of an object from a reference video frame to a target video frame.

FIG. 2 is an illustration of an example data flow 200 for using the visual tracking system 100 to track a positon of an object from a reference video frame 202 to a target video frame 204.

The system 100 starts by decolorizing the reference video frame 202 and the target video frame 204, e.g., by converting them to corresponding grayscale video frames.

The system 100 processes the reference video frame 202 and the target video frame 204 using the embedding neural network 206 to generate embeddings corresponding to the pixels of the reference video frame 202 and the target video frame 204. The embedding neural network 206 is a convolutional neural network (CNN), that is, a neural network that includes one or more convolutional neural network layers.

The output of the embedding neural network 206 after processing an input video frame (e.g., the reference frame 202 or the target frame 204) can be represented as a three-dimensional (3D) matrix of numerical values, with two "spatial" dimensions and one "channel" dimension. The embedding corresponding to a pixel of the input video frame at a particular spatial position (e.g., defined by (x,y) coordinates in the input video frame) is determined by extracting a portion of the embedding neural network output at the corresponding spatial position (i.e., along the channel dimension). In some cases, the spatial dimensionality of the embedding neural network output may be the same as the input video frame, e.g., the input video frame may have a spatial dimensionality of 256×256, and the embedding neural network output may have a spatial dimensionality of 256×256 with 200 channels. In some other cases, the spatial dimensionality of the embedding neural network output may be greater or lesser than the spatial dimensionality of the input video frame, e.g., the input video frame may have a spatial dimensionality of 256×256, and the embedding neural network output may have a spatial dimensionality of 50×50 with 200 channels.

The embedding neural network 206 can have any appropriate neural network architecture. In one example, the embedding neural network architecture may include a ResNet-18 neural network architecture followed by a five layer 3D convolutional neural network. The spatial locations of each pixel in an input video frame (e.g., represented as respective 2D vectors in the range [−1,1]) may be provided as an intermediate input to the embedding neural network.

To track the position of the object 208 (i.e., illustrated in FIG. 2 as a triangle) from the reference frame 202 to the target frame 204, the system 100 determines respective similarity measures between embeddings corresponding to pixels from the target frame 204 and embeddings corresponding to pixels from the reference frame 202. In this example, the system 100 may identify the position of the object 208 in the target frame 204 based on the similarity measure between the embedding $f_i$ of the object 208 in the reference frame 202 and the embedding $f_j$ in the target frame 204. The system 100 trains the embedding network 206 to generate embeddings 210 that can be used to colorize the target frame 204 by generating predicted colors 212 of the target frame 204 based on the reference colors 214 of the reference frame 202.

Figures 3, 4:
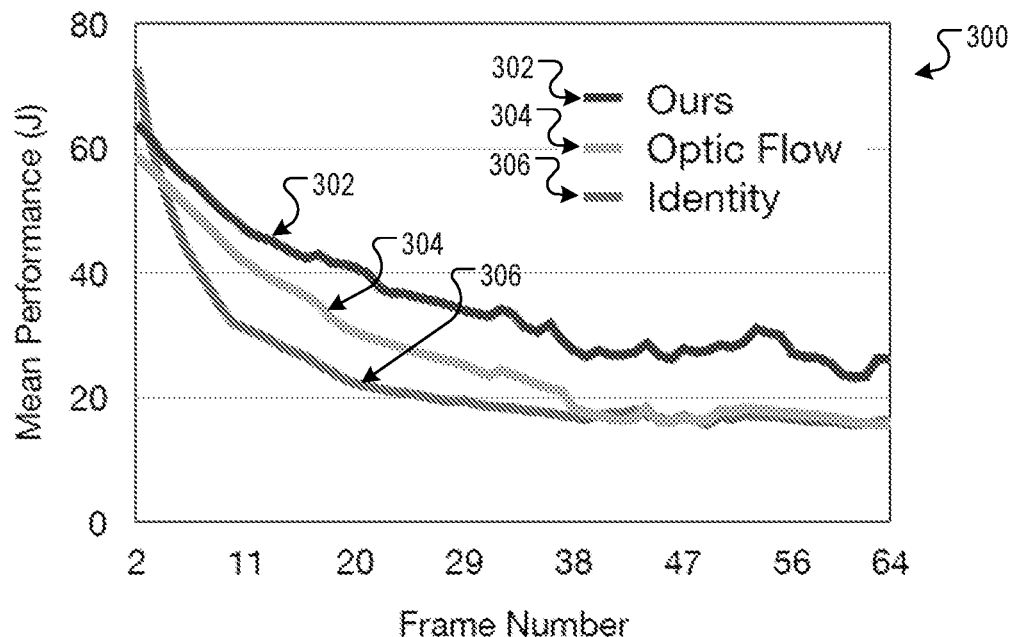
FIG. 3 illustrates a graph showing the performance of various tracking systems as a function of time while performing video segmentation.
FIG. 4 shows the performance of various "unsupervised" and "supervised" tracking systems while performing video segmentation.

FIG. 3 and FIG. 4 illustrate examples of the performance gains that can be achieved by using the visual tracking system described in this specification to perform a video segmentation task. In a video segmentation task, a semantic segmentation of one or more initial video frames in a video is provided, and the tracking system propagates the semantic segmentation to the remaining video frames in the video. A semantic segmentation of a video frame specifies a label corresponding to each pixel of the video frame.

FIG. 3 illustrates a graph 300 showing the performance of various tracking systems as a function of time (i.e., video frame number) while performing video segmentation. The tracking system 302 refers to the tracking system described in this specification. The tracking system 304 uses optic flow techniques to performing tracking. The tracking system 306 performs tracking by associating each pixel in a video frame with the corresponding pixel at the same spatial position in the preceding video frame. The horizontal axis of the graph 300 identifies the frame number of the video frame being segmented, and the vertical axis identifies the mean performance of each tracking system at segmenting video frames. The performance of a tracking system at segmenting a video frame can be determined as the overlap between: (i) the actual segmentation of the video frame, and (ii) the segmentation of the video frame determined by the tracking system. It can be appreciated that the tracking system 302 described in this specification outperforms each baseline tracking method.

FIG. 4 shows the performance of various "unsupervised" and "supervised" tracking systems while performing video segmentation. Performance is evaluated in the "Segment" column of the table 400 based on the overlap between the actual and estimated segmentations of each video frame, and in the "Boundary" column based on the similarity between the borders of respective regions in the actual and estimated segmentation of each video frame. A supervised tracking method refers to a tracking method that is trained with the benefit of labeled images, e.g., images associated with known tracking data or semantic segmentations. An unsupervised tracking method (such as tracking method described in this specification) is trained without using labeled images. In some cases, the performance of supervised tracking methods can be expected to upper-bound the performance of unsupervised tracking methods.

The "Identity" tracking method 402 performs tracking by associating each pixel in a video frame with the corresponding pixel at the same spatial position in the preceding video frame (as described earlier). The "Single Image Colorization" tracking method 404 performs tracking in a similar manner as the system described in this specification, except the pixel embeddings are generated as an intermediate output of a neural network trained to perform single image colorization (i.e., by processing a grayscale image to generate a color image). The "Optical Flow (Coarse-to-Fine)" tracking method 406 uses optical flow techniques to perform tracking and is described with reference to Liu, C., et al.: "Beyond pixels: exploring new representations and applications for motion analysis", Phi) thesis, Massachusetts Institute of Technology (2009). The "Optical Flow (FlowNet2)" tracking method 408 uses optical flow techniques to perform tracking and is described with reference to Ilg, E., et al.: "Flownet 2.0: Evolution of optical flow estimation with deep networks", IEEE Conference no Computer Vision and Pattern Recognition (CVPR), Volume 2 (2017). The "Ours" tracking method 410 refers to the tracking method described in this specification. The "Fully Supervised" tracking method 412 refers to the fully supervised tracking method described with reference to, e.g., Yang, L., et al.: "Efficient video object segmentation via network modulation", arXiv: 1802.01218 (2018). It can be appreciated that the tracking method described in this specification achieves a performance that is closer to that of the fully supervised tracking method that any of the other unsupervised tracking methods.

Figure 5:
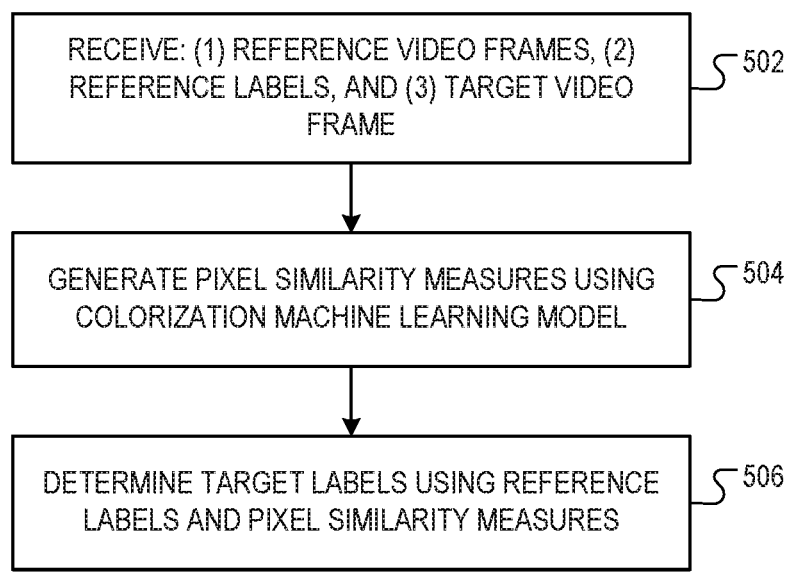
FIG. 5 is a flow diagram of an example process for performing visual tracking.

FIG. 5 is a flow diagram of an example process 500 for performing visual tracking. For convenience, the process 500 will be described as being performed by a system of one or more computers located in one or more locations. For example, a visual tracking system, e.g., the visual tracking system 100 of FIG. 1, appropriately programmed in accordance with this specification, can perform the process 500.

The system receives: (i) one or more reference video frames, (ii) respective reference labels for each of multiple reference pixels in the reference video frames, and (iii) a target video frame (502). Generally, the reference video frames and the target video frame are drawn from the same video. The reference video frames may precede the target video frame in the video, follow the target video frame in the video, or a combination of both, i.e., some of the reference video frames may precede the target video frame, while the remaining reference video frames may follow the target video frame. The system may receive reference labels for every pixel in the reference video frames, or for only a proper subset of the pixels in the reference video frames (e.g., for only pixels corresponding to a particular object depicted in the reference video frames). The reference labels may have been determined by manual annotation by a person, or may have been previously generated using the process 500. Generally, the system decolorizes the reference video frames and the target video frame by removing some or all of the data defining the colors of the pixels, e.g., by converting the video frames to a grayscale format.

The system processes the reference video frames and the target video frames using a colorization machine learning model to generate respective pixel similarity measures between each of (i) multiple target pixels in the target video frame and (ii) multiple reference pixels in the reference video frames (504). In particular, the system provides the reference video frames and the target video frame as respective inputs to an embedding neural network that is configured to process an input video frame to generate an output that defines a respective embedding for each pixel in the input video frame. The system may determine the pixel similarity measure $A_{ij}$ between a target pixel j from the target video frame and a reference pixel i from a reference video frame as:

$$A_{ij} = \frac{\exp\left(\frac{f_i^T f_j}{T}\right)}{\sum_k \exp\left(\frac{f_k^T f_j}{T}\right)} \quad (1)$$

where $f_i^T \in \mathbb{R}^D$ is the transpose of the embedding for reference pixel i, $f_j$ is the embedding for target pixel j, T is a temperature parameter (e.g., T=0.5, or T=1), and the sum is over each reference pixel k. The colorization machine learning model (in particular, the embedding neural network) is trained to generate pixel similarity measures having the property that the color of each target pixel can be effectively estimated by combining the: (i) the actual colors of the reference pixels, and (ii) the pixel similarity measures. Training of the colorization machine learning model is described in more detail with reference to FIG. 6.

The system determines a respective target label for each target pixel in the target video frame based on (i) the reference labels for the reference pixels, and (ii) the pixel similarity measures between the reference pixels and the target pixels (506). For example, the system may determine the target label for a target pixel j in the target video frame as:

$$l_j = \sum_i A_{ij} \cdot l_i \quad (2)$$

where represents the pixel similarity measure between target pixel j and reference pixel i (as described with reference to equation (1)), $l_i$ represents the reference label for reference pixel i, and the sum is over each reference pixel i in the reference video frames.

In some implementations, the reference labels indicate whether each reference pixel is included in a particular object, and by determining the target labels, the system "tracks" the object from the reference video frames to the target video frame. In some other implementations, the reference labels define a semantic segmentation of the reference video frames by indicating a respective category (e.g., object category) for each reference pixel, and by determining the target labels, the system propagates the semantic segmentation to the target video frame.

Figure 6:
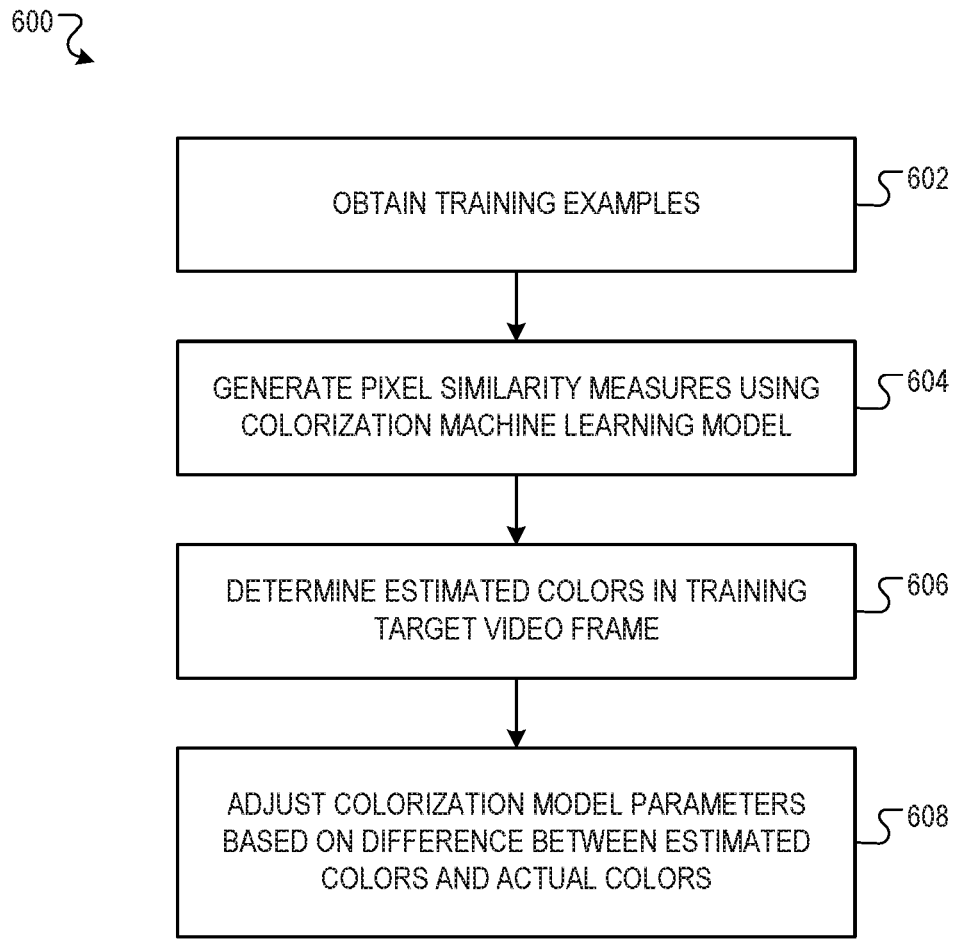
FIG. 6 is a flow diagram of an example process for training a colorization machine learning model.

FIG. 6 is a flow diagram of an example process 600 for training a colorization machine learning model. For convenience, the process 600 will be described as being performed by a system of one or more computers located in one or more locations. For example, a visual tracking system, e.g., the visual tracking system 100 of FIG. 1, appropriately programmed in accordance with this specification, can perform the process 600.

The system obtains one or more training examples (602). Each training example includes: (i) one or more training reference video frames, (ii) a training target video frame, and (iii) actual colors of each of the pixels in the training reference video frames and the training target video frame. The system may obtain the training examples, e.g., by randomly sampling a predetermined number of training examples from a set of training data that includes multiple training examples.

The colors of the pixels in the training reference video frames and the training target video frame can be represented in any of a variety of ways. In one example, the color of a pixel can be represented "continuously", e.g., as a 3D vector of red, green, and blue color values that can assume values in a continuous range of possible values. In another example, the color of a pixel can be represented "discretely", e.g., as a one-hot vector indicating a particular "reference" color value from a predetermined set of possible reference color values. The set of possible reference color values may be determined by clustering a set of vectors representing the colors of pixels in a set of images or videos, e.g., using a k-means or expectation-maximization clustering technique. A pixel may be determined to correspond to the reference color that is closest to its actual color.

The system processes the training reference video frames and the training target video frame using the colorization machine learning model to generate respective pixel similarity measures between: (i) each pixel in the training target video frame, and (ii) each pixel in the training reference video frames (604). An example process for generating such similarity measures using an embedding neural network of the colorization machine learning model is described in more detail with reference to step 504 of FIG. 5.

The system determines estimated colors of each pixel in the training target video frame by combining: (i) the actual colors of each pixel in the training reference video frames, and (ii) the pixel similarity measures (606). For example, the system may determine the estimated color $\hat{c}_j$ of a target pixel j in the training target video frame as:

$$\hat{c}_j = \sum_i A_{ij} \cdot c_i \quad (3)$$

where $A_{ij}$ represents the pixel similarity measure between target pixel j and reference pixel i, represents the color of reference pixel i, and the sum is over each reference pixel i in the training reference video frames.

The system adjusts the current values of the embedding neural network parameters of the colorization machine learning model based on a difference between: (i) the actual colors of each pixel in the training target video frame, and (ii) the estimated colors of each pixel in the training target video frame (608). For example, the system may adjust the current values of the embedding neural network parameters using a gradient of a loss function with respect to the current values of the embedding neural network parameters. The loss function may be, e.g., a cross-entropy loss between the actual colors and the estimated colors of the pixels of the training target video frame. The system may determine the gradient using, e.g., a backpropagation technique. The system may use the gradient to adjust the current values of the embedding neural network parameters using the update rule of any appropriate gradient descent optimization algorithm, e.g., RMSprop or Adam.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both; one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback; e.g., visual feedback; auditory feedback, or tactile feedback; and input from the user can be received in any form, including acoustic, speech, or tactile input. In addition; a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A method comprising:
receiving: (i) one or more reference video frames, (ii) respective reference labels for each of a plurality of reference pixels in the reference video frames, and (iii) a target video frame;
processing the reference video frames and the target video frame using a colorization machine learning model to generate respective pixel similarity measures between each of (i) a plurality of target pixels in the target video frame, and (ii) the reference pixels in the reference video frames, comprising:
providing the reference video frames and the target video frame as an input to an embedding neural network that is included in the colorization machine learning model;
processing the input in accordance with current values of embedding neural network parameters to generate a respective embedding of each of (i) the target pixels in the target video frame, and (ii) the reference pixels in the reference video frames; and
generating the respective pixel similarity measures between each of (i) the target pixels in the target video frame, and (ii) the reference pixels in the reference video frames using the embeddings;
wherein the colorization machine learning model is trained to generate pixel similarity measures wherein a respective estimated color of each of target pixel in the target video frame is defined by combining: (i) actual colors of each of the reference pixels in the reference video frames, and (ii) the pixel similarity measures; and
determining a respective target label for each target pixel in the target video frame, comprising:
combining (i) the reference labels for the reference pixels in the reference video frames, and (ii) the pixel similarity measures.

2. The method of claim 1, wherein the reference pixels in the reference video frames comprise a proper subset of the pixels in the reference video frames.

3. The method of claim 1, wherein the reference video frames and the target video frames are decolorized prior to being processed by the colorization machine learning model.

4. The method of claim 1, wherein the embedding neural network comprises one or more convolutional neural network layers.

5. The method of claim 1, wherein generating the respective pixel similarity measures between each of (i) the target pixels in the target video frame, and (ii) the reference pixels in the reference video frames using the embeddings comprises:
generating the pixel similarity measure between a target pixel and a reference pixel using a similarity measure between the embedding of the target pixel and the embedding of the reference pixel.

6. The method of claim 1, wherein a label for a pixel comprises data indicating, for each of multiple possible categories, a respective likelihood that the pixel corresponds to the category.

7. The method of claim 1, wherein a label for a pixel comprises data indicating, for each of multiple possible key points, a respective likelihood that the pixel corresponds to the key point.

8. The method of claim 1, wherein the colorization machine learning model is trained by a plurality of operations comprising:
obtaining a plurality of training examples, wherein each training example comprises: (i) one or more training reference video frames, (ii) a training target video frame, and (iii) actual colors of each pixel in the training reference video frames and the training target video frame;
processing the training reference video frames and the training target video frame using the colorization machine learning model to generate respective similarity measures between: (i) each pixel in the training target video frame, and (ii) each pixel in the training reference video frames;
determining estimated colors of each pixel in the training target video frame by combining: (i) the actual colors of each pixel in the training reference video frames, and (ii) the similarity measures; and
adjusting the current values of the embedding neural network parameters based on a difference between: (i) the actual colors of each pixel in the training target video frame, and (ii) the estimated colors of each pixel in the training target video frame.

9. The method of claim 8, wherein adjusting the current values of the embedding neural network parameters comprises:
determining a gradient of a loss function, wherein the loss function depends on the difference between: (i) the actual colors of each pixel in the training target video frame, and (ii) the estimated colors of each pixel in the training target video frame; and
adjusting the current values of the embedding neural network parameters using the gradient.

10. The method of claim 1, wherein the reference labels for the reference pixels in one or more of the reference video frames were previously determined using the colorization machine learning model.

11. The method of claim 1, further comprising using the target labels to track a position of an object in the reference video frames to the target video frame.

12. A system, comprising:
a data processing apparatus; and
a memory in data communication with the data processing apparatus and storing instructions that cause the data processing apparatus to perform operations comprising:
receiving: (i) one or more reference video frames, (ii) respective reference labels for each of a plurality of reference pixels in the reference video frames, and (iii) a target video frame;
processing the reference video frames and the target video frame using a colorization machine learning model to generate respective pixel similarity measures between each of (i) a plurality of target pixels in the target video frame, and (ii) the reference pixels in the reference video frames, comprising:
providing the reference video frames and the target video frame as an input to an embedding neural network that is included in the colorization machine learning model;
processing the input in accordance with current values of embedding neural network parameters to generate a respective embedding of each of (i) the target pixels in the target video frame, and (ii) the reference pixels in the reference video frames; and
generating the respective pixel similarity measures between each of (i) the target pixels in the target video frame, and (ii) the reference pixels in the reference video frames using the embeddings;

wherein the colorization machine learning model is trained to generate pixel similarity measures wherein a respective estimated color of each of target pixel in the target video frame is defined by combining: (i) actual colors of each of the reference pixels in the reference video frames, and (ii) the pixel similarity measures; and determining a respective target label for each target pixel in the target video frame, comprising:
combining (i) the reference labels for the reference pixels in the reference video frames, and (ii) the pixel similarity measures.

13. One or more non-transitory computer storage media storing instructions that when executed by one or more computers cause the one or more computers to perform operations comprising:

receiving: (i) one or more reference video frames, (ii) respective reference labels for each of a plurality of reference pixels in the reference video frames, and (iii) a target video frame;

processing the reference video frames and the target video frame using a colorization machine learning model to generate respective pixel similarity measures between each of (i) a plurality of target pixels in the target video frame, and (ii) the reference pixels in the reference video frames, comprising:
providing the reference video frames and the target video frame as an input to an embedding neural network that is included in the colorization machine learning model;
processing the input in accordance with current values of embedding neural network parameters to generate a respective embedding of each of (i) the target pixels in the target video frame, and (ii) the reference pixels in the reference video frames; and
generating the respective pixel similarity measures between each of (i) the target pixels in the target video frame, and (ii) the reference pixels in the reference video frames using the embeddings;

wherein the colorization machine learning model is trained to generate pixel similarity measures wherein a respective estimated color of each of target pixel in the target video frame is defined by combining: (i) actual colors of each of the reference pixels in the reference video frames, and (ii) the pixel similarity measures; and determining a respective target label for each target pixel in the target video frame, comprising:
combining (i) the reference labels for the reference pixels in the reference video frames, and (ii) the pixel similarity measures.

14. The non-transitory computer storage media of claim 13, wherein the reference pixels in the reference video frames comprise a proper subset of the pixels in the reference video frames.

15. The non-transitory computer storage media of claim 13, wherein the reference video frames and the target video frames are decolorized prior to being processed by the colorization machine learning model.

16. The non-transitory computer storage media of claim 13, wherein the embedding neural network comprises one or more convolutional neural network layers.

17. The non-transitory computer storage media of claim 13, wherein generating the respective pixel similarity measures between each of (i) the target pixels in the target video frame, and (ii) the reference pixels in the reference video frames using the embeddings comprises:
generating the pixel similarity measure between a target pixel and a reference pixel using a similarity measure between the embedding of the target pixel and the embedding of the reference pixel.

18. The non-transitory computer storage media of claim 13, wherein a label for a pixel comprises data indicating, for each of multiple possible categories, a respective likelihood that the pixel corresponds to the category.

19. The non-transitory computer storage media of claim 13, wherein a label for a pixel comprises data indicating, for each of multiple possible key points, a respective likelihood that the pixel corresponds to the key point.

20. The non-transitory computer storage media of claim 13, wherein the colorization machine learning model is trained by a plurality of operations comprising:
obtaining a plurality of training examples, wherein each training example comprises: (i) one or more training reference video frames, (ii) a training target video frame, and (iii) actual colors of each pixel in the training reference video frames and the training target video frame;
processing the training reference video frames and the training target video frame using the colorization machine learning model to generate respective similarity measures between: (i) each pixel in the training target video frame, and (ii) each pixel in the training reference video frames;
determining estimated colors of each pixel in the training target video frame by combining: (i) the actual colors of each pixel in the training reference video frames, and (ii) the similarity measures; and
adjusting the current values of the embedding neural network parameters based on a difference between: (i) the actual colors of each pixel in the training target video frame, and (ii) the estimated colors of each pixel in the training target video frame.

* * * * *